2,840,751
Patented June 24, 1958

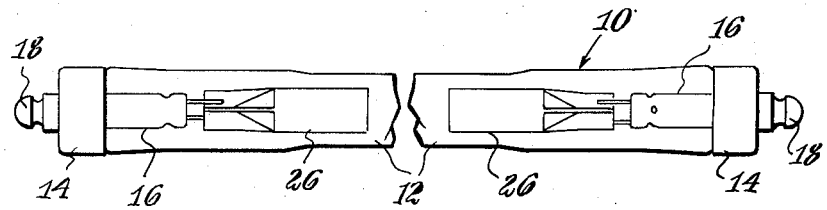
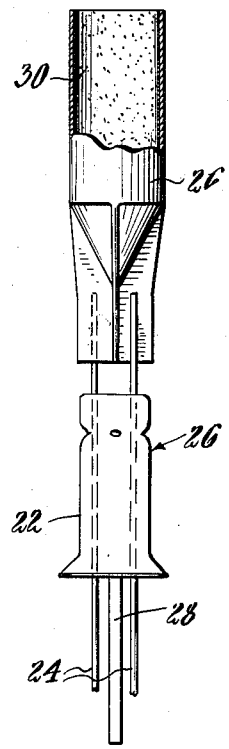

2,840,751

ELECTRODE COATING COMPOSITION AND ELECTRODE FOR COLD CATHODE GAS DISCHARGE LAMP

George Meister, Newark, and Thomas H. Heine, Cedar Grove, N. J., assignors to Westinghouse Electric Corporation, East Pittsburgh, Pa., a corporation of Pennsylvania Application May 28, 1953, Serial No. 358,044

9 Claims. (Cl. 313—339)

The present invention relates to gas discharge lamps and, more particularly to electrodes and to electrode coatings for cold cathode type gas discharge lamps, which may be used as fluorescent lamps or as ultraviolet sources.

The basic difference between a cold and hot cathode discharge lamp is in the electrode used. In the hot cathode type discharge lamp a filament type of electrode is used which is adaptable to relatively high current ranges. In the cold cathode discharge lamp, a very large emission material coated electrode instead of a filament is used, so that the electrode operates fairly cold. The life of this large "cold" electrode is not shortened by frequent starting or by operation at lower currents, and the lamp is consequently widely used for low brightness, low current applications. Heretofore, the electrode emission material generally used on cold cathodes has been a mixture of the triple carbonates, barium, strontium and calcium carbonate, a typical triple carbonate formulation being Ba, Sr, Ca, 56:31:13 by weight, as is well known in the art. This triple carbonate mixture has never proved entirely satisfactory in cold cathode gas discharge lamps, for while such a lamp first operates at reasonable voltages, the voltages will rise after use until the operating voltages approximates that of a bare cathode lamp. The reason for this rise in voltage is not definite, but apparently after operation the electrode emission coating is completely destroyed and the lamp then operates as though the metallic electrode had no emission material coated thereon.

In addition, where the triple carbonate emission coating is used, a phenomenon of "spiralling" is often encountered after the lamp has been in operation.

A further objection to the use of a triple carbonate emission coating is the electrode sputtering which is caused by the increased operating voltages encountered after the lamp has been in service.

It is the general object of the present invention to avoid and overcome the foregoing and other difficulties of and objections to prior art practices by the provision of a coated electrode and an electrode coating comprising activating a coated mixture of lithium compounds.

Another object of the invention is to provide an electrode coating which is prepared by activating a mixture of a lithium compound which will provide lithium oxide on decomposition, and a lithium compound which will reduce during activation to lithium metal and also simultaneously act as a reducing agent, while producing an inert or a reducing atmosphere.

Still another object of the invention is to provide an electrode coating for a cold cathode discharge lamp which electrode coating is prepared by activating a mixture of either lithium carbonate, lithium oxalate, lithium tartrate, lithium formate, lithium hydroxide, lithium nitrite or lithium nitrate, and either lithium hydride, lithium azide, or lithium amide.

The aforesaid objects of the invention and other objects which will become apparent as the description proceeds are achieved by providing an emission coating for a cold cathode discharge lamp electrode, which coating is prepared by activating a coated mixture containing a lithium compound which decomposes on activation to lithium oxide, and a lithium compound which decomposes on activation to lithium metal and simultaneously produces an inert or a reducing atmosphere.

For a better understanding of the invention, reference should be had to the accompanying drawings, wherein:

Fig. 1 is a cut-away view of a cold cathode bactericidal lamp having electrodes coated with our new emission coating;

Fig. 2 is an enlarged view of one of the two mounts used in the improved cold cathode bactericidal lamp, wherein the electrode of the mount is internally coated with our new emission material;

Fig. 3 is a flow diagram of the method utilized in preparing our emissive coating for the cold cathode bactericidal lamp electrode.

Although the principles of the invention are broadly applicable to any electrode for a discharge device, the invention is often employed in conjunction with a cold cathode bactericidal lamp and hence it has been so illustrated and will be so described.

With specific reference to the form of the invention illustrated in the drawing, the numeral 10 indicates the lamp generally, which lamp comprises an ultraviolet transmitting, hollow, substantially cylindrical envelope 12, with bases 14 at each end of said envelope, and mounts 16 sealed approximately at either end of said envelope. Electrical connection adapters 18 are positioned on either end of the lamp 10 at approximately the geometrical center of the bases 14.

The mount 16 comprises generally a stem 22, lead-in conductors 24, electrode 26, and an exhaust tubulation 28. As heretofore noted, such mounts as illustrated in Fig. 2 are sealed by means of a re-entrant press at approximately each end of envelope 12, as is common in the art. Only one mount 16, as used in the lamp 10, need have an exhaust tube 28, as is common in the art. The lead-in conductors 24 support the electrode 26 within the envelope 12 and make electrical connection to the electrical contact adapters 18. The electrode or cathode 26 has the general configuration of a hollow cylinder, closed at one end and preferably fabricated of iron or nickel. Coated on the inner surface of the electrode 26 is our new and improved emission material 30.

The emission coating 30 for the inner surface of electrode 26 is prepared by activating a mixture of a lithium compound which decomposes on application of heat to lithium oxide, and a lithium compound which decomposes on application of heat to lithium metal while producing an inert or reducing atmosphere. Shown in the following table, designated as Table I, are lithium compounds which may be used as the lithium containing components of the inactivated mixture. Also shown in Table I are the permissible ratios for the lithium containing components comprising this mixture:

Table 1

| Lithium Compound (which decomposes on application of heat to lithium oxide) | Amount, moles | Lithium Compound (which decomposes on application of heat to lithium metal while producing an inert or reducing atmosphere) | Amount, moles |
|---|---|---|---|
| $Li_2CO_3$ | 1 | $LiH$ | 1–3 |
| $Li_2C_2O_4$ | 1 | $LiNH_2$ | 1–3 |
| $LiCHO_2$ | 1 | $LiN_3$ | 1–3 |
| $Li_2C_4H_4O_6$ | 1 | | |
| $LiOH$ | 1 | | |
| $LiNO_3$ | 1 | | |
| $LiNO_2$ | 1 | | |

Thus, any one or more of the lithium compounds indicated in the left-hand column above may be admixed with any one or more of the lithium compounds indicated in the right-hand column above, in the amounts as indicated.

Specific examples of compositions and proportions for the lithium containing constituents of our inactivated emissive coating are listed in numerical order in the following table, designated as Table II.

*Table II*

| Lithium Compound | Amount, moles | Lithium Compound | Amount, moles |
| --- | --- | --- | --- |
| 1. $Li_2CO_3$ | 1 | LiH | 2 |
| 2. $Li_2CO_3$ | 1 | $LiNH_2$ | 3 |
| 3. $Li_2CO_3$ | 1 | $LiN_3$ | 1 |
| 4. $Li_2C_2O_4$ | 1 | LiH | 1 |
| 5. $Li_2C_2O_4$ | 1 | $LiNH_2$ | 1 |
| 6. $Li_2C_2O_4$ | 1 | $LiN_3$ | 3 |
| 7. $LiCHO_2$ | 1 | LiH | 1.5 |
| 8. $LiCHO_2$ | 1 | $LiNH_2$ | 2 |
| 9. $LiCHO_2$ | 1 | $LiN_3$ | 2.5 |
| 10. $Li_2C_4H_4O_6$ | 1 | LiH | 2.5 |
| 11. $Li_2C_4H_4O_6$ | 1 | $LiNH_2$ | 1.5 |
| 12. $Li_2C_4H_4O_6$ | 1 | $LiN_3$ | 2 |
| 13. LiOH | 1 | LiH | 2 |
| 14. LiOH | 1 | $LiNH_2$ | 1.5 |
| 15. LiOH | 1 | $LiN_3$ | 1.5 |
| 16. $LiNO_3$ | 1 | LiH | 2.5 |
| 17. $LiNO_3$ | 1 | $LiNH_2$ | 2 |
| 18. $LiNO_3$ | 1 | $LiN_3$ | 1.5 |
| 19. $LiNO_2$ | 1 | LiH | 1.5 |
| 20. $LiNO_2$ | 1 | $LiNH_2$ | 2 |
| 21. $LiNO_2$ | 1 | $LiN_3$ | 1.5 |

In preparing our new emission coating, we first thoroughly mix, by grinding, the heretofore-noted lithium containing materials in the proportions as indicated in Table I. This finely ground mixture is then mixed with a binder, such as nitrocellulose, and a solvent, such as butyl acetate to form a coating suspension. Suggested proportions for the coating suspension referred to above are: 1 gram lithium containing material as listed under Table I, 1 gram solvent, and ½ to 1% by weight of binder. The foregoing proportions for the coating suspension may vary greatly, depending upon whether the suspension is to be applied to the inner surface of electrode 26 by spraying, flowing, brushing, etc. The type of application for which the fabricated cold cathode bactericidal lamp is to be used will also effect the proportions of the components comprising the coating suspension. The coating suspension is then applied to the inner surface of the hollow tubular electrode 18 by spraying, flowing, etc. as previously indicated. The coated mounts 16 are then sealed into either end of envelope 12, and the envelope is exhausted through exhaust tubulation 28 (exhaust means not shown). Toward the end of the exhaust period, the electrodes 26 are activated.

The process of activation is accomplished by induction heating the coated electrodes 26 to a temperature of 800 to 1000° C. for a period of 3–5 minutes, or until outgassing of the decomposed emission coating ceases. This activation heat serves to volatilize the binder and any remaining solvent as well as decompose the lithium compounds. The envelope 12 is continually evacuated, of course, during the foregoing activation period. When outgassing is stopped and the evacuation is complete, the necessary mercury and inert ionizable starting gases are added through the exhaust tubulation 28, which is then tipped-off, as is common in the art. The usual starting gas pressure is about 4–20 mm. mercury of inert ionizable gas, preferably argon, or a mixture of neon and argon.

Tests conducted with our new and novel lamp have resulted in greatly improved life. These tests were conducted using two control lamps, one of which control lamps had an emission coating consisting of the heretofore-noted standard triple carbonate emission mixture, and the other of which control lamps had a lithium compound emission coating in which the lithium containing constituent of the inactivated emission coating was lithium carbonate. In the results given, the experimental lamp had an emission coating in which the lithium containing constituents of the inactivated emission coating were lithium carbonate and lithium hydride in the proportions of 1 mole to 2 moles. Results are indicated in the following table, designated as Table III:

*Table III*

| Coating Compound (Regular triple carbonate—Ca, Ba, Sr) | | Coating Component (Inactivated Formulation, $Li_2CO_3$) | | Coating Compound (Inactivated Formulation, $Li_2CO_3$, 1 mole, LiH, 2 moles) | |
| --- | --- | --- | --- | --- | --- |
| Hrs. | Operating Volts | Hrs. | Operating Volts | Hrs. | Operating Volts |
| 0 | 213 | 0 | 174 | 0 | 197 |
| 117 | 280 | 120 | 176 | 120 | 169 |
| 1,513 | 295 | 1,772 | 179 | 1,968 | 168 |
| (Emission Material apparently destroyed). | | 3,184 | 198 | 3,800 | 169 |
| | | 4,504 | 224 | 5,500 | 162 |
| | | 10,744 | 249 | 10,613 | 172 |
| | | (Emission Material apparently destroyed). | | 12,000 | 173 |

It is apparent from the foregoing test results that the life our our new and improved cold cathode bactericidal lamp is greatly increased where the lithium-containing constituent in the inactivated emission coating consists of a lithium compound which decomposes on heating to lithium oxide, and a lithium compound which decomposes on heating to lithium metal and produces an inert or reducing atmosphere.

The foregoing tests on our improved cold cathode bactericidal lamp have also shown that a limited amount of sputtering is encountered even after 12,000 hours of operation. On the heretofore-noted control lamps the sputtering was quite extensive after 150 hours in the case of the triple carbonate, and after 4500 hours in the case of lithium carbonate without the addition of the lithium compound which decomposes on heating to lithium metal while simultaneously producing an inert or reducing atmosphere.

In addition, our tests have disclosed that there is no spiralling encountered in our new and improved cold cathode bactericidal lamp, even after 12,000 hours of operation. In contrast, in the heretofore-noted control lamps, after a few hundred hours of operation, the spiralling is apt to occur.

The operation of our lamp is substantially the same as the standard cold cathode bactericidal lamp using the triple carbonate emission coating with the operating cathode temperature being about 150° C. When an energizing potential is applied across electrical connection adapters 18, a positive column gas discharge is set up between electrodes 26, which discharge emits ultraviolet radiation, as is well-known in the art. This ultraviolet radiation passes ultraviolet transparent envelope 12 ionizing the oxygen in the surrounding air, which has a bactericidal effect, as is well known.

It will be recognized that the objects of the invention have been achieved by providing electrode coatings and electrodes for a cold cathode bactericidal lamp which has extended life, wherein the operating voltage is maintained relatively low throughout the life of the lamp. In addition, the phenomenon of spiralling has been all but eliminated and sputtering has been materially reduced.

As an alternative embodiment of our invention, the improved electrode coating may be used in conjunction with a cold cathode fluorescent lamp. In such a lamp the construction could be substantially the same as heretofore described and illustrated for the cold cathode bactericidal lamp, except that the envelope 12 would necessarily be ultraviolet opaque and visible light transparent, instead of ultraviolet transparent. In addition, an ultraviolet sensitive phosphor coating would be included on the inner surface of envelope 12 for converting ultraviolet radiation to visible light, as is well known.

While in accordance with the patent statutes, one best embodiment of the invention has been described in detail, it is to be particularly understood that the invention is not limited thereto or thereby.

We claim:

1. A coating composition for use in forming an electrode coating for a cold-cathode low-pressure positive-column discharge device, said composition consisting of a mixture of a first lithium compound which decomposes on heating to lithium oxide and a second lithium compound which decomposes on heating to lithium metal while producing a non-oxidizing atmosphere, and said first lithium compound and said second lithium compound being mixed in the molar ratio of from 1:1 to 1:3.

2. A coating composition for use in forming an electrode coating for a cold-cathode low-pressure positive-column discharge device, said composition consisting of a mixture of one of the first group consisting of lithium carbonate, lithium oxalate, lithium tartrate, lithium formate, lithium hydroxide, lithium nitrate and lithium nitrite, and one of the second group consisting of lithium hydride, lithium amide and lithium azide, and the molar ratio of one of said first group to one of said second group being from 1:1 to 1:3.

3. An electrode comprising a hollow cylindrical metal shell which is open at one end and carrying an electron-emissive coating on the inner surface thereof, said coating having been prepared by mixing together a first lithium compound which decomposes on heating to lithium oxide, and a second lithium compound which decomposes on heating to lithium metal while producing a non-oxidizing atmosphere, the molar ratios of said first lithium compound and said second lithium compound being from 1:1 to 1:3, forming a suspension of said mixed lithium compounds by mixing same with a binder and a solvent, coating said suspension onto the inner surface of said electrode shell, placing said coated electrode shell in an evacuated container, heating said coated electrode shell to a temperature of from 800° C. to 1000° C. to decompose said coating, and continuing said heating until degassing of said coating ceases.

4. An electrode comprising a hollow cylindrical metal shell which is open at one end and carrying an electron-emissive coating on the inner surface thereof, said coating having been prepared by mixing together, lithium-containing compounds of one of the first group consisting of lithium carbonate, lithium oxalate, lithium tartrate, lithium formate, lithium hydroxide, lithium nitrate and lithium nitrite, and one of the second group consisting of lithium hydride, lithium amide and lithium azide, the molar ratio of one of said first group to one of said second group being from 1:1 to 1:3, forming a suspension of said mixed lithium compounds by mixing same with a binder and a solvent, coating said suspension onto the inner surface of said electrode shell, placing said coated shell into an evacuated container, heating said coated shell to a temperature of from 800° C. to 1000° C. to break down said lithium compounds, and continuing said heating until degassing of said coating ceases.

5. A coating composition for use in forming an electrode coating for a cold-cathode low-pressure positive-column discharge device, said coating composition consisting of a mixture of lithium carbonate and lithium hydride, and the molar ratio of said lithium carbonate to said lithium hydride being 1 to 2.

6. A coating composition for use in forming an electrode coating for a cold-cathode law-pressure positive-column discharge device, said composition consisting of a mixture of lithium oxalate and lithium hydride, and the molar ratio of said lithium oxalate to said lithium hydride being 1 to 1.

7. A coating composition for use in forming an electrode coating for a cold-cathode low-pressure positive-column discharge device, said composition consisting of a mixture of lithium formate and lithium hydride, and the molar ratio of said lithium formate to said lithium hydride being 1 to 1.5.

8. A coating composition for use in forming an electrode coating for a cold-cathode low-pressure positive-column discharge device, said composition consisting of a mixture of lithium tartrate and lithium hydride, and the molar ratio of said lithium tartrate to said lithium hydride being 1 to 2.5.

9. A coating composition for use in forming an electrode coating for a cold-cathode low-pressure positive-column discharge device, said composition consisting of a mixture of lithium hydroxide and lithium hydride, the molar ratio of said lithium hydroxide to said lithium hydride being 1 to 2.

References Cited in the file of this patent

UNITED STATES PATENTS

| | | |
|---|---|---|
| 1,740,700 | Nickel et al. | Dec. 24, 1929 |
| 1,767,437 | De Boer et al. | June 24, 1930 |
| 1,966,211 | Millis | July 10, 1934 |
| 2,020,727 | Gaidies | Nov. 12, 1935 |
| 2,336,960 | Reuter et al. | Dec. 14, 1943 |
| 2,391,572 | Herzog | Dec. 25, 1945 |
| 2,433,218 | Herzog | Dec. 23, 1947 |
| 2,716,716 | Hughes et al. | Aug. 30, 1955 |